(12) United States Patent
Anderson (10) Patent No.: US 8,273,400 B2
(45) Date of Patent: Sep. 25, 2012

(54) TOTAL MIXED RATION EQUINE FEED

(76) Inventor: Harlan R. Anderson, Cokato, MN (US)

( * ) Notice: Subject to any disclaimer, the term of this patent is extended or adjusted under 35 U.S.C. 154(b) by 1195 days.

(21) Appl. No.: 11/757,876

(22) Filed: Jun. 4, 2007

(65) Prior Publication Data
US 2008/0299261 A1    Dec. 4, 2008

(51) Int. Cl.
A23K 1/00    (2006.01)
A23K 3/02    (2006.01)

(52) U.S. Cl. ........... 426/636; 426/74; 426/531; 426/807

(58) Field of Classification Search ............... 426/74, 426/531, 636, 807
See application file for complete search history.

(56) References Cited

U.S. PATENT DOCUMENTS

| | | | |
|---|---|---|---|
| 2,995,445 A * | 8/1961 | Briggs et al. | 426/311 |
| 3,485,016 A * | 12/1969 | McClellan et al. | 56/16.4 D |
| 3,802,394 A | 4/1974 | Mahler | |
| 3,946,115 A | 3/1976 | Brever et al. | |
| 4,166,867 A | 9/1979 | Betz et al. | |
| 4,197,320 A | 4/1980 | Betz et al. | |
| 4,258,031 A | 3/1981 | Tollett et al. | |
| 4,338,336 A | 7/1982 | Glabe et al. | |
| 4,666,891 A | 5/1987 | Ginsberg et al. | |
| 4,813,154 A | 3/1989 | Ronning | |
| 4,847,095 A | 7/1989 | Alley et al. | |
| 5,053,235 A | 10/1991 | Alley et al. | |
| 5,236,717 A | 8/1993 | Vinci | |
| 5,290,767 A * | 3/1994 | Rowe | 514/30 |
| 5,352,252 A | 10/1994 | Tolmie | |
| 5,429,436 A * | 7/1995 | Stone | 366/141 |
| 5,657,621 A | 8/1997 | Mendes et al. | |
| 5,952,024 A | 9/1999 | Theuninck et al. | |
| 6,333,304 B1 | 12/2001 | Bath et al. | |
| 6,481,373 B2 | 11/2002 | Swetzig | |
| 6,495,192 B2 | 12/2002 | Bezreh | |
| 6,537,544 B1 | 3/2003 | Johansson et al. | |
| 6,596,326 B1 | 7/2003 | Evju | |
| 6,858,239 B2 | 2/2005 | Julien | |
| 2001/0029897 A1 | 10/2001 | Swetzig | |
| 2003/0054085 A1 | 3/2003 | Anderson | |
| 2003/0108653 A1 | 6/2003 | Julien | |
| 2005/0008679 A1 | 1/2005 | Bedding et al. | |
| 2005/0136087 A1 | 6/2005 | Freehauf | |
| 2005/0214438 A1 | 9/2005 | McCormick | |
| 2006/0045908 A1 | 3/2006 | Moss | |
| 2007/0036837 A1 | 2/2007 | Bedding et al. | |
| 2007/0110880 A1 | 5/2007 | Thomas et al. | |

FOREIGN PATENT DOCUMENTS

| | | | |
|---|---|---|---|
| GB | 2343832 A * | 5/2000 | |
| WO | 9849903 | 11/1998 | |

OTHER PUBLICATIONS

Fae Holin ("TMRs for Horses" downloaded from http://hayandforage.com/mag/farming_tmrs_horses/) dated Jan. 2004, 2 pages.*
"Eckenberg Farms", downloaded from http://web.archive.org/web/20050308184052/http://www.eckenbergfarms.com/products_products_totalmixed_rationcubes.htm, dated Mar. 8, 2005, 2 pages.*
Watts (Clin. Tech. Equine Pract, vol. 3, pp. 88-95, 2004).*
Longland et al. J. Nutr., vol. 136, pp. 2099S-2102S, 2006.*
"Alfalfa Cubes. An Alternative Forage", Press Release dated Apr. 16, 1999, downloaded from http://www.thehorse.com, 2 pages.*
Coleman et al.'Alfalfa Cubes for Horses', Cooperative Extensive Services, Univ. of Kentucky, Pamphlet dated Jul. 2000, 2 pages.*
MAZURI © Leaf-Eater Primate Diet 5M02, 2 pages, PMI Nutritional International, 1 page pamphlet dated Oct. 2, 2001.*
MAZURI © ADF-# 16 Herbivore 5648, 2 pages, PMI Nutritional International, 1 page pamphlet dated Jun. 25, 2002.*
Valentine, "EPSM Diet Goals" aticle dated Apr. 2006, downloaded from www.ruralheritage.com/vet_clinic/epsmdiet_goals.htm.*
"Premium Forage Cubes", downloaded from internet archived pages dated Mar. 16, 2000, at http://www.triplecrown.com/forage.php.*
FORAGE FIRST Timothy/Alfalfa Cubes, downloaded from internet archived pages dated May 23 2006, http://www.admaini.com/AllianceEquine/ForageFirstTimothyAlfalfaCubes.htm.*
Reilly et al. "Answers for Insulin Resistant Horses", downloaded from http://www.holistichorse.com on Mar. 2011.*
"Sugar Content in Timothy Hay and Orchard Grass Hay", downloaded from http://www.ehow.com on Mar. 2011.*
Cuddeford, Nutrition Sci., vol. 22, No. 2, p. 89, 2002.*
Gill et al., "For Horses?," Feed Management Magazine, vol. 57, No. 1, 2 pp, Jan./Feb. 2006.
"A Revolutionary New Way to Feed Horses," Endorsed by AQHA, 6 pp, prior to Jun. 4, 2007.
"Eckenberg Farms Products Total Mixed Ration Cubes," 2 pp, printed May 16, 2007.
Montana Pride, "A Revolutionary New Way to Feed Horses," 4 pp, prior to Jun. 4, 2007.
Montana Pride, "ALFA 300, ALFA 400, ALFA 500, ALAFA 600," 2 pp, Mar. 1996.
Montana Pride, "Veterinary Applications of Montana Pride Feeds," 2 pp, prior to Jun. 4, 2007.
Purina Mills Ultium—Competition Horse Formula, 5 pp, printed May 8, 2007.
Purina Mills, Complete Product List, 8 pp, printed May 8, 2007.

* cited by examiner

*Primary Examiner* — Chhaya Sayala
(74) *Attorney, Agent, or Firm* — Seager Tufte & Wickhem LLC (57) ABSTRACT

An illustrative method of making a total mixed ration (TMR) equine biscuit including a fibrous material and one or more nutritional supplements may include suspending the one or more nutritional supplements with the fibrous material and impregnating the one or more nutritional supplements into the fibrous material. The biscuit may have a starch content of less than 6 percent by weight. The biscuit may have a sugar content of less than 15 percent by weight.

11 Claims, 5 Drawing Sheets

TOTAL MIXED RATION EQUINE FEED

FIELD

The present invention relates generally to equine feed, and more particularly, to total mixed ration (TMR) equine feed.

BACKGROUND

Recently, there has been an increased demand for an equine feed product that can provide a consistent, balanced nutrition equine regimen. Proper nutrition can help to improve the health and performance of the horse. In many cases, the equine regimen has been to provide forage pasture and/or hay) and nutritional supplements separately and in limited amounts. However, variations in the forage can make it difficult to provide a consistent, nutritional source of forage. The resultant fluctuations in nutrient content of the forages make it difficult to provide consistent, balanced nutrition regimen.

To try and provide a consistent and balanced nutrition regimen, some manufactures have produced equine feed including chopped hay and liquid and/or dry supplements mixed together in a bag. Typically, the mixture can be bagged using a compression bagging technique or gravity fed bagging technique. However, with both of these bagging techniques, the nutritional supplements tend to sift out of the mixture and fall to the bottom of the bag during transit. Consequently, in some cases, the mixture may not have a desired consistency when feeding the mixture to a horse. Additionally, when hay and nutritional supplements are loosely mixed together, horses may pick through the mixture and consume portions of the mixture at different levels at times of the day. Therefore, there is a need for a consistent, balanced, processed, formulated equine feed.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to equine feed, and more particularly, to total mixed ration (TMR) equine feed. In one illustrative embodiment, a method of making a total mixed ration equine biscuit including a fibrous material having a plurality of fibers and one or more nutritional supplements is provided. The method may include suspending at least some of the one or more nutritional supplements with at least some of the fibrous material and impregnating at least some of the one or more nutritional supplements into at least some of the fibers of the fibrous material.

In another illustrative embodiment, a total mixed ration equine feed may include a biscuit including a mixture of a fibrous material and a nutritional supplement. In some cases, the biscuit may have a non-structural carbohydrate content of less than 15 percent by weight. In some cases, the biscuit may have a starch content of less than 6 percent by weight. In some cases, the biscuit may have a sugar content of less than 15 percent by weight.

BRIEF DESCRIPTION

The invention may be more completely understood in consideration of the following detailed description of various illustrative embodiments of the invention in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

The present invention relates generally to equine feed, and more particularly, to equine total mixed ration feed. In an illustrative embodiment, the total mixed ration (TMR) equine feed may provide a total diet for equine except for salt and water. In other words, the TMR may provide all the daily nutrients required for a particular type, size, age, and/or activity of horse.

In the illustrative embodiment, the TMR can be in the form of a biscuit. In the illustrative case, the biscuit may be a modified cube. For example, the biscuit may be modified to be much softer than a traditional cube, which are typically very hard. Additionally, in some cases, the biscuit may be modified to be smaller or shorter than the traditional cubes. Traditional cubes are usually one and one quarter inch wide by one and one quarter inch high by three inches long. The illustrative biscuit may be one and one quarter inch high by one and one quarter inch wide by three-quarter inch long. However, it is contemplated that the biscuit may be any desired length cube from about half an inch to three inches, as desired.

In some cases, the biscuit may have many advantages over the traditional cube. For example, in one case, the smaller size and softness of the biscuit may help to reduce the risk of choking in horses. Also, the size and softness of the biscuit may help to increase the palatability of the biscuit. In some cases, the softness of the biscuit may help make it easier for the horse to chew and may increase lubricating and buffering saliva production by the salivary glands. In some cases, the illustrative soft biscuit may help the total mixture remain in tack until consumed while at the same time increasing the dwell time of the feed in the mouth for the horse to help develop adequate saliva for lubrication that may be needed for swallowing as well as the buffering needed for the stomach.

In the illustrative embodiment, the biscuit can include a roughage or fibrous material. In some example cases, the fibrous material can include alfalfa, alfalfa grass, grass, or any other nutritional fibrous material, as desired. In some cases, the processed fibers may help to increase the palatability of the feed. Additionally, the fibrous material may be configured to have an appropriate fiber length. In some cases, the fiber length may be long enough to achieve the scratch factor and improved digestive environment in the caccum and large intestine of the horse. In some cases, the fiber length may be in the range of half an inch to three inches. In some cases, at least some of the fibers may have a length of one and a half inches or smaller. In some cases, at least some of the fibers may have a length of at least one inch. In one example, at least some of the fibers may have a length of one and one quarter inches long. However, it is contemplated that any suitable fiber length may be used, as desired. In some cases, the fibrous material may be processed to be a relatively low sugar fibrous material, as will be discussed in further detail. In some cases, the length of the fibrous material may help the digestive process in the hindgut of the horse.

In the illustrative embodiment, the TMR biscuit can include one or more additives or nutritional supplements. In some cases, the feed can be formulated to meet the horse's healthy diet recommendation. In some cases, the formula may be designed to not exceed the diet recommendation of the particular horse. The nutritional supplements may be provided to supplement the nutrition of the fibrous material to meet the desired formula. In some cases, the nutritional additives may be liquid and/or dry supplements, as desired. In one example, the nutritional additives may be chosen from fermented products, such as, for example, flax, wheat, barley, oats, as well as many other nutritional sources, as desired. In some cases, as will be discussed in further detail below, the nutritional supplement may be impregnated, embedded, coated, or otherwise secured to the fibrous material, such as, for example, in the fibers of the fibrous material.

One advantage of the illustrative biscuit may be helping to prevent the horse from separating the fibrous material from the nutritional supplement. Another advantage may be that the biscuit may be provided to a horse owner premixed. In some cases, this may help the horse owner by not having to locate or change the feed mixture. Changes to the nutritional content of the forages are of great concern to the horse owner. In these cases, the horse may consume a more consistent and balanced diet.

Figure 1:
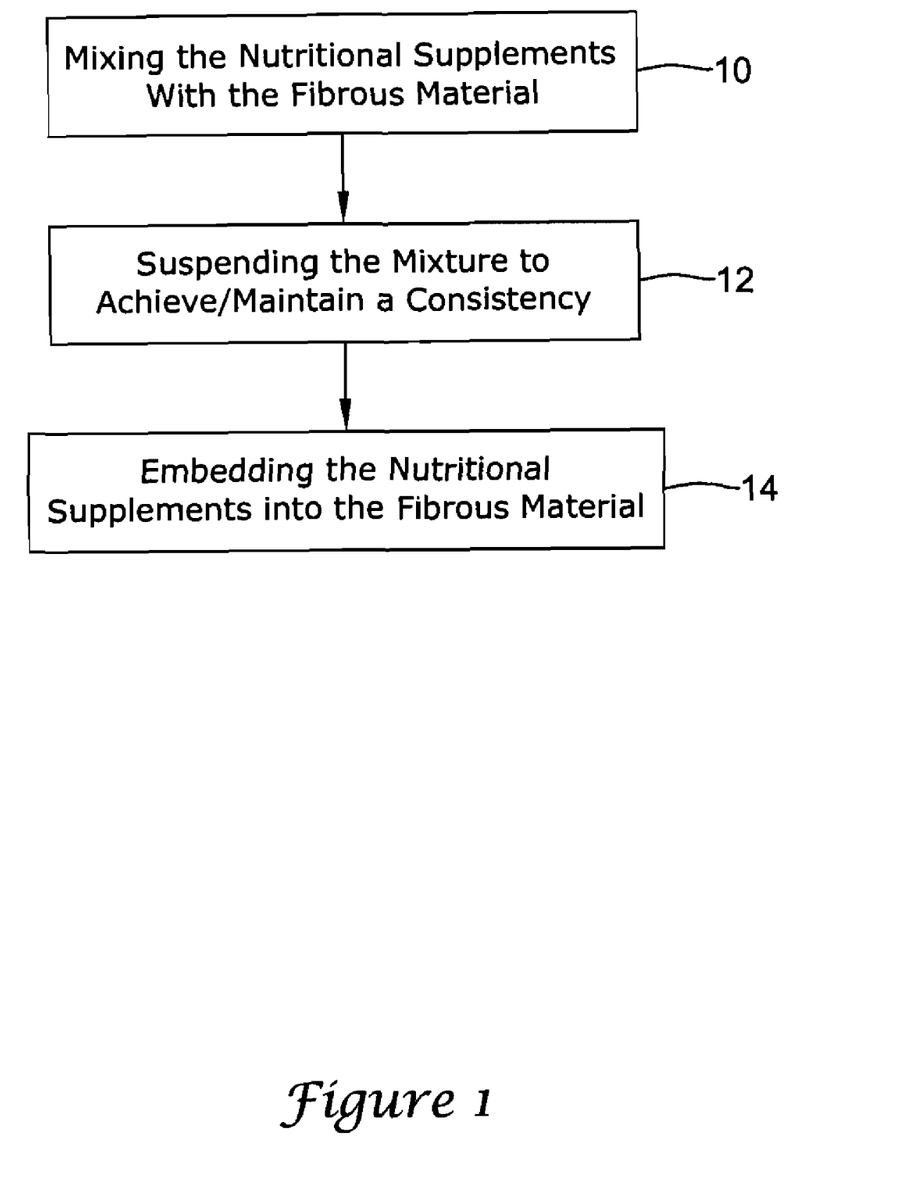
FIG. 1 is a flow diagram of an illustrative method of making the illustrative total mixed ration equine biscuit.

FIG. 1 is a flow diagram of an illustrative method of making the illustrative total mixed ration equine biscuit. In block 10, nutritional supplements may be mixed with the fibrous material. In some cases, the nutritional supplements may be determined, in part, according to a nutritional recommendation for a particular type, size, age, and activity of the horse, as desired. In some cases, the nutritional supplements may be determined, in part, according to the quality of the fibrous material, but this is not required. For example, the nutrition value of the fibrous material may be determined and then nutritional supplements may be mixed with the fibrous material as needed to supplement the nutritional value of the fibrous material to achieve the nutritional recommendations.

Next or simultaneously, in block 12, the fibrous material and the nutritional supplements can be suspended to achieve and/or maintain a consistency of the mixture of fibrous material and nutritional supplements. The suspension may help to prevent the nutritional supplements from separating from the fibrous material to achieve a relatively consistent biscuit. In some cases, the bulk density of the fibrous material and the bulk density of the nutritional supplements may be different. So, in order to prevent them from separating in the mixture, the mixture may be held in suspension.

Then, in block 14, the nutritional supplements may be impregnated or embedded into, or coated with or otherwise secured to the fibrous material. In some cases, the impregnating, embedding, coating, or otherwise securing to, may be accomplished by pressing the nutritional supplements into the fibers of the fibrous material. In one case, as will be discussed in further detail below, a cuber may be used, but this is not required.

In the illustrative embodiment, the impregnating, embedding, coating, or otherwise securing of the nutritional supplement into or onto the fibers of the fibrous material may help the biscuit, as a whole, have a similar or the same nutritional value of a single fiber extracted from the cube. Additionally, the nutritional supplement being embedded within the fibers of the fibrous material may help to achieve a relatively consistent balance of the feed.

Figure 2:
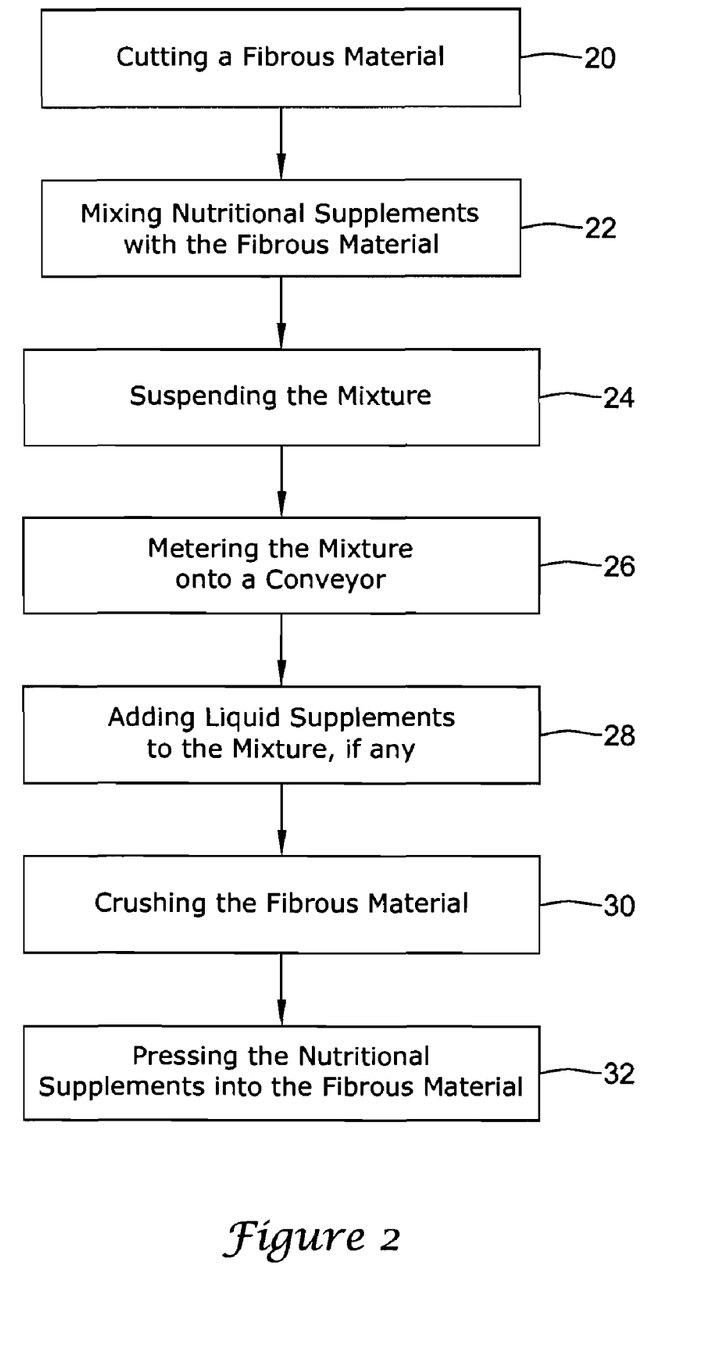
FIG. 2 is a flow diagram of an illustrative method of making the illustrative total mixed ration equine biscuit.

FIG. 2 is a flow diagram of an illustrative method of making the illustrative total mixed ration equine biscuit. In the illustrative embodiment, the fibrous feed material may be placed into a blender or vertical mixer. In one example embodiment, the vertical blender may be a Roto-Mix 855 available from Roto-Mix of Dodge City Kans. In some cases, the fibrous feed material may be in the form of small square bales, large square bales, large round bales, or any other size or type of bale, as desired. In some eases, the fibrous material may also be loose hay and/or grass, if desired. In some cases, the fibrous feed material may be alfalfa, alfalfa grass, grass, or any other nutritional fibrous material, as desired. In some cases, the vertical blender may mix the entire fibrous material, including stems and leaves of the fibrous material.

With the fibrous material in the vertical blender, then, in block 20, the fibrous material may be disassembled and cut to a desired length. In one illustrative example, the length of the fibrous feed material may be in the range of four to six inches. However, it is contemplated that any suitable length may be used, as desired.

Next, in block 22, one or more nutritional supplements may be mixed with the fibrous material in the vertical blender, if desired. The nutritional supplements may be liquid and/or dry supplements, as desired. In some cases, the amount of liquid and/or dry supplements that may be added to the vertical blender may be based, in part, on the feed analysis of the fibrous material, such as the nutritional content. The illustrative feed analysis may be designed for types, sizes, activities, and/or ages of horses. Illustrative nutritional supplements may include, but are not limited to bran, cereal grains, fermented derived products and other traditional forms of vitamins and minerals. It is contemplated that the nutrients may be placed in the vertical blender at the same time that the fibrous material is placed in the vertical blender or after the fibrous material has been placed in the vertical blender, as desired.

Then, in block 24, the mixture may be suspended in the vertical blender. In some cases, the suspension may occur during the mixing process of block 22, if desired. In the illustrative embodiment, the vertical blender may include a chamber for mixing the feed. In some cases, the chamber may include a vertically oriented central member having one or more protruding knife like cutting edges extending from the central member. In one case, the central member may be cone-shaped; however, any suitable shape may be used, as desired. In one case, the one or more protruding edges may be helically wound about the central member, such as, for example, like a screw.

In operation, the central member having the one or more protruding edges may rotate or twist to mix the feed. In one case, when the central member rotates, the one or more protruding edges may lift the feed away from the bottom of the chamber. As the feed reaches the top of the central member, it may fall from the central member towards the outer edges of the chamber while other feed is being lifted by the central member. In some cases, the continuous lifting, turning and falling action may help to thoroughly mix the feed ingredients. In some cases, the mixture process may last for a few minutes. For example, in one case, the mixture time may be about 30 minutes. Once the mixing is complete, the central member may be able to move the feed to a discharge area of the chamber.

Next, the feed may be transferred from the discharge area of the vertical blender to a metering box. In one example embodiment, the metering box may be a designed unit available from Warren Baerg Manufacturing located in Dinuba Calif. The metering box, in block 26, may meter the mixture onto a conveyor. In the illustrative embodiment, the metering box may help maintain the composition of the mixture and may help to prevent the mixture from separating.

In one illustrative embodiment, the metering box may include a floor and leveling augers positioned above the floor near the top of the metering box. In some cases, the metering box may also include two doffers, a bottom doffer configured to pull the mixture forward under the bottom of the doffer and a top doffer configured to push up and to the rear of the doffer. In some cases, the two doffers may be positioned at 45 degrees with respect to the floor of the metering box and rotate in opposite directions. The illustrative metering box may be able to regulate the flow of the feed from the metering box discharge conveyor. However, it is contemplated that any suitable metering box may be used, as desired. The rate of flow of the feed from the metering box is adjusted by the variable speed of the floor chain that advances the feed toward the two doffers. The even flow of feed from the metering box is important for efficiency of the final process and also to maintain a proper mix.

After the feed mixture is discharged from the metering box onto a conveyor, the mixture may travel along the conveyor to a second mixer. In one example embodiment, the second mixer may be a Warren Baerg Mixing Spike Auger available from Warren Baerg Manufacturing. In the second mixer, block 28, liquid supplements may be added to the mixture, if desired. In the case when liquid supplements are desired, the liquid supplements may be added to the mixture via one or more spray nozzles of the mixer. In some cases, the second mixer may include an auger to provide a final mixing action for the feed before entering a densifier.

Then, the feed may be dropped into a densifier. For example, the densifier may be a cuber, which, in one case, may be a Warren Baerg Cuber. In the illustrative embodiment, in block 30, the densifier may crush the stems of the fibrous material. This step may break down the cell walls of the fibrous feed material. Additionally, in block 32, the densifier may provide necessary pressure impregnating, embedding, or otherwise securing of at least some of the nutritional supplements to the fibers of the fibrous material. In some cases, the crushing may size the fibers into a length of less than two inches. In one case, the length may be in the range of one inch to one and a half inches. However, it is contemplated that any suitable length may be used, as desired.

In the illustrative densifier, the pressing force may be adjusted according to a desired hardness of the biscuit. In some cases, the pressing force of the densifier may have a sufficient force to embed at least some of the nutritional supplements into the fibrous material, such as, for example, into the individual fibers of the fibrous material. In one case, the Warren Baerg cuber may be set to achieve a force of nearly 10,000 pounds per square inch (psi). However, it is contemplated that the psi of the cuber may be adjusted to achieve a desired hardness of the biscuit, as desired. In some cases, the crushing step and the pressing step may occur at the same time, but this is not required.

Next, the feed may be densified by being extruded through multiple dies of the cuber. In the illustrative embodiment, the dies may be square. However, it is contemplated that any suitable shaped die may be used, as desired. In one case, the square die may include a 4 way taper. However, in some cases, a 2 way taper or no taper may be used, as desired.

When the feed is extruded through the die, the feed may be broken-off at a desired length. In some cases, the feed may have a break-off in the range of one-quarter inch to two inches, as desired. In one example case, the feed may have a three-quarter inch break-off length. However, it is contemplated that any suitable break-off length may be used, as desired.

Figure 3:
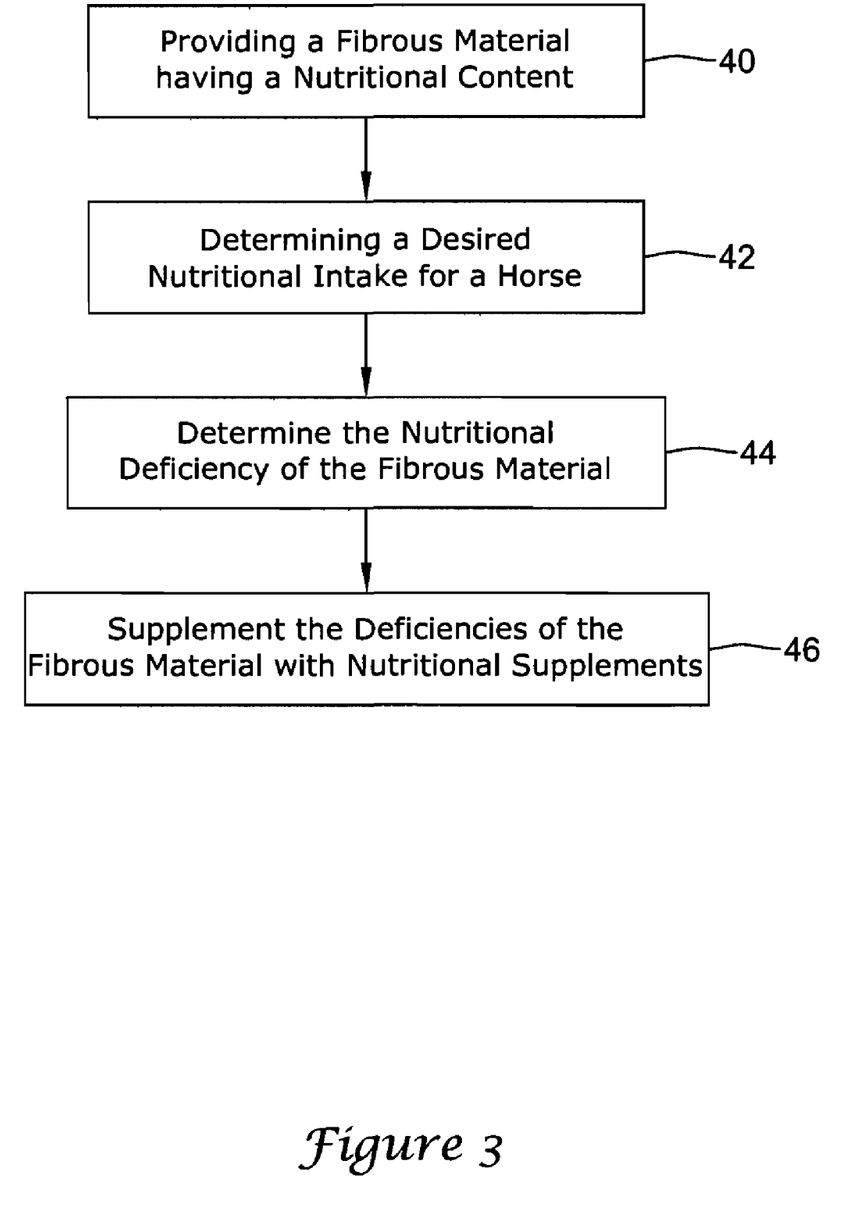
FIG. 3 is a flow diagram of an illustrative method of determining the nutritional content of the total mixed ration equine biscuit.

FIG. 3 is a flow diagram of an illustrative method of determining the nutritional content of the total mixed ration equine biscuit. While the present method is described with reference to a biscuit, it is contemplated that the method may be used with any form of feed, as desired.

In block 40, a fibrous material may be provided having a nutritional content. Then, in block 42, the desired nutritional content of a particular horse can be determined. In some cases, the nutritional content can be based on the National Research Councils (NRC) 2007 recommendations for a particular type, age, size, activity of horse, as desired. However, it is contemplated that any nutritionally correct recommendations may be used, as desired. Furthermore, it is contemplated that the block 40 and 42 may be reversed or performed at the same time, if desired.

In many cases, the nutritional supplements of the TMR biscuit may be determined according to the type, age, size, and/or activities of the horse. For example, there may be a formulary designed for young foals, a formulary for maintenance, a formulary for performance horses, a formulary for mature horses, and a formulary for overweight horses. Each formulary may be designed to address the specific needs of that particular horse type, age, size, and/or activity.

Next, in block 44, the deficiencies of the fibrous material can be determined for the desired nutritional intake of the horse. With this method, the fibrous material can be the primary source of nutrients for the horse and the additives merely supplement the nutrients of the fibrous material.

Then, in block 46, the deficiencies of the fibrous material can be compensated by adding needed nutritional supplements to the fibrous material. In some cases, the supplemental nutrition may be embedded into the fibers of the fibrous material during the process of making the equine biscuit, but this is not required.

The illustrative TMR biscuit may be a low sugar, low starch, and/or high fiber biscuit. In some cases, the biscuit can have a generally low non-structural carbohydrate (NSC) value, which may be the sum of the sugars and starches. In some cases, the non-structural carbohydrates may be 20 percent by weight or less, but this is not required. In one case, the non-structural carbohydrates may be 15 percent or less by weight. Further, in another case, the non-structural carbohydrates (NSC) may be 10 percent or less by weight, but this is not required.

In some cases, the TMR biscuit may have a starch content of less than ten percent by weight. In one example case, the starch content may be less than six percent by weight. In another example case, the starch content may be less than four percent by weight. In another example case, the starch content may be less than two percent by weight. However, it is contemplated that any suitable starch content may be used, as desired.

In some cases, the TMR biscuit may have a sugar content of less than 20 percent by weight. In one example case, the sugar content may be less than 15 percent by weight. In another example case, the sugar content may be less than 10 percent by weight. In another example case, the sugar content may be less than six percent by weight. However, it is contemplated that any suitable sugar content may be used, as desired.

Additionally, in some cases, to have a relatively low starch level, some embodiments use a minimal amount of grain, if any. In one case, the TMR biscuit may include no grain, if desired. In another case, the grain may only make up a relatively small percentage of the biscuit, such as, for example not over 10 percent, or, in another case, not over 5 percent. However, it is contemplated that, if desired, grains may be added to the TMR biscuit, as desired. Grains can include, for example, but are not limited to, oats, corn, and barley.

In some cases, the TMR biscuit may include a minimal amount of molasses, or, in one case, no molasses. Molasses may include a relatively high amount of sugar, which, in some cases, may be undesirable. However, it is contemplated that a small amount of molasses may be used in the TMR biscuit, such as, 1%, if desired.

In one example embodiment, the TMR biscuit may include a formulary for mature horses, which, in one case, may be called Senior Supper™, available from Idle Acres located in Cokato, Minn. In this illustrative embodiment, the mature TMR biscuit may be formulated to provide a complete and balanced diet for mature horses. In some cases, the formula may be based on a set of nutritional guidelines, such as the NRC or any other source of nutritional guidelines, but this is not required. In one example embodiment, Senior Supper™ may include a mixture of alfalfa and grass with about 5 percent finely ground oats, about 5 percent wheat bran, and about 2.5 percent of a commercially available equine supplements, which in one case may be EquiPride available from Walhalla, N. Dak. However, the foregoing mixture is merely illustrative and it is contemplated that the mixture may change depending on the forage nutrients, any changes in equine nutritional guidelines, and/or for any other reason, as desired.

In one illustrative embodiment, the mature TMR biscuit may have a formula including protein in the range of 10-16%. In one case, the protein may be in the 12-14% range. In some cases, the mature TMR biscuit may also include calcium at about a 2:1 ratio to Phosphorus, but this is not required. In some cases, Calcium may be at about 1.3% of daily recommended intake, but this is not required.

In some cases, when fed a non-TMR regimen high in starch (grains), mature horses can begin to loose weight. In response to the weight loss, the non-TMR high starch regimen may be increased to try to increase the weight. However, in some cases, this may cause the horse to loose even more weight. In the illustrative embodiment, the forage based low starch TMR biscuit may help mature horses to curb the weight loss, and in some cases, may even help the mature horse to gain weight. In some cases, the low starch and fibrous material may help to improve the digestive system of the horse.

In a second example embodiment, the formulary included in the biscuit for young foals may be the formulary for Next Generation™, available from Idle Acre located in Cokato, Minn. In this illustrative embodiment, the young foal TMR biscuit may be formulated to provide a complete and balanced diet for young foals. In some cases, the formula may be based on a set of nutritional guidelines, such as the NRC or any other source of nutritional guidelines, but this is not required. In one example, Next Generation™ may include a mixture of alfalfa with about 5 percent finely ground oats, about 5 percent wheat bran, and about 2.5 percent of a commercially available equine supplements, which in one case may be EquiPride available from Walhalla, N. Dak. However, the foregoing mixture is merely illustrative and it is contemplated that the mixture may change depending on the forage nutrients, any changes in equine nutritional guidelines, and/or for any other reason, as desired.

In one illustrative case, the young foal TMR biscuit may have a formula including protein in the range of 10-25%. In one case, the protein may be in the 15-18% range. In another case, the protein may be at least 16%. The young foal TMR biscuit may also include calcium at about 1.6% of the daily recommended intake. The illustrative TMR may also include sources of Vitamin D and Phosphorus, as well as many other supplements, as desired.

In many cases, young foals are fed feeds to stimulate growth. However, in some cases, this can lead to skeletal development issues that can significantly affect the health of the horse. In the illustrative embodiment, the young foal formulary may help to slow the growth of the horse to help prevent bone growth issues.

In some embodiments, the forage selected for the biscuit may be a physically mature forage, such as, for example, full bloom alfalfa. In many cases, alfalfa may be harvested before it reaches physical maturity so that it may have a high percent of nutrients. However, as the alfalfa ages, the amount of fiber in the alfalfa increases and the other nutrients stay relatively constant. In essence, a physically mature alfalfa may have an increased percentage of fiber and a lower percentage of other nutrients. In some cases, the present embodiment may include physically mature alfalfa to increase the fiber and decrease the percentages of other nutrients, if desired.

Figure 4:
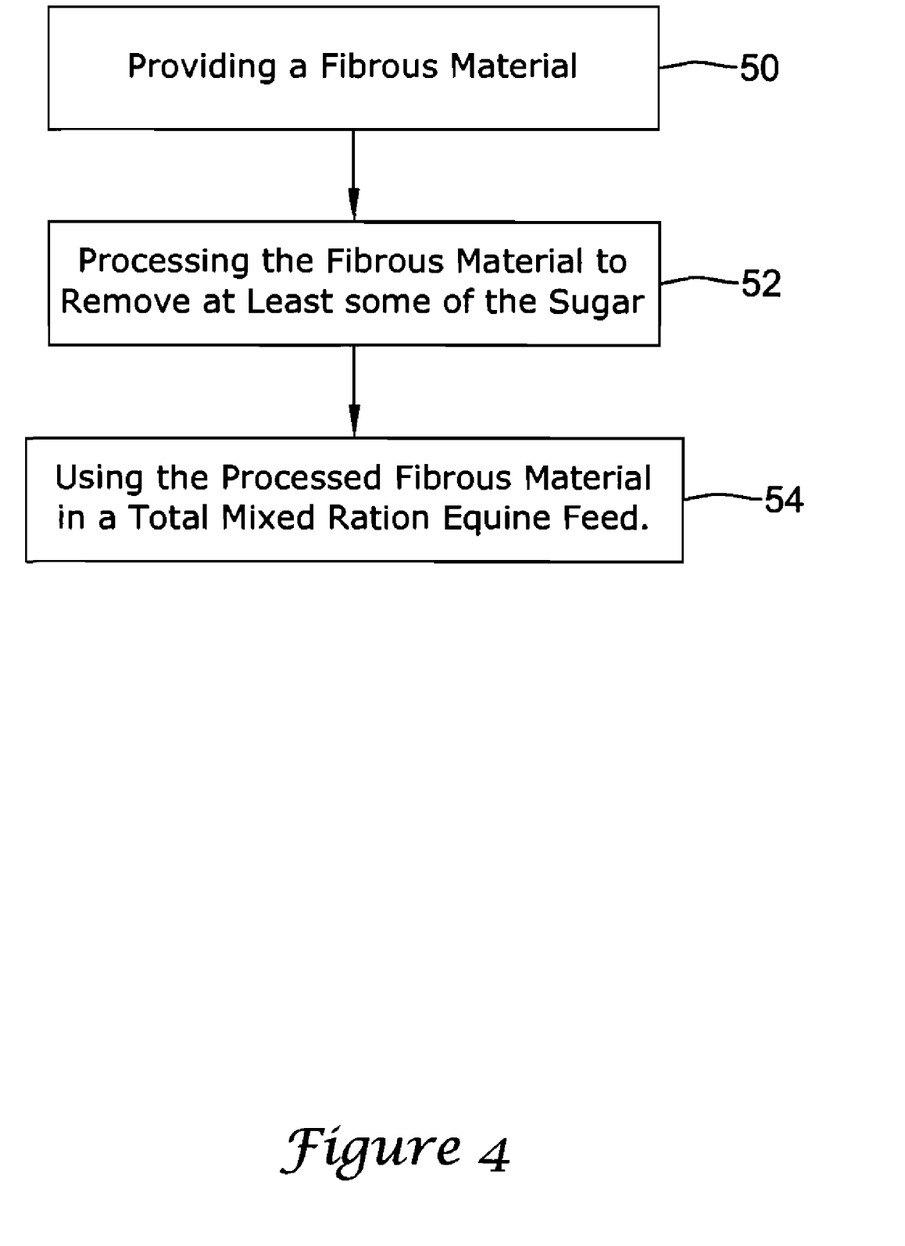
FIG. 4 is a flow diagram of an illustrative method of processing fibrous material to be low sugar.

FIG. 4 is an illustrative method of processing a fibrous material to be low sugar for equine feed. In the illustrative embodiment, the processed low sugar fibrous material may be used as the fibrous material in the equine feed, such as, for example, the TMR biscuit discussed previously, but this is not required.

In block 50, a fibrous material can be provided. In some cases, the fibrous material, such as, for example, alfalfa or grass may include many minerals and nutrients. In particular, the fibrous material may include water soluble sugar.

Next, in block 52, the fibrous material can be processed to remove at least some of the sugar. In some cases, the processing may include washing the fibrous material to remove at least some of the water soluble sugar. In some cases, the washing may be with a hose end, a sprinkler, a wash tub, or, in some cases, rain, or any other suitable washing method, as desired. Generally, wet hay (i.e. rained on hay) has been considered to be undesirable. However, in some cases, processing the fibrous material to remove the sugar making the fibrous material low sugar may be desirable. This process can, depending on the particular fiber, reduce the palatability of the forage.

Then, as shown in block 54, and in some cases, the low sugar fibrous material may be used in a TMR feed, such as, for example, the TMR biscuit discussed previously. In some cases, nutritional supplements may be added to the biscuit to compensate for the deficiencies of the fibrous materials.

In some cases, the low sugar biscuit may be used to help reduce the caloric intake of horses, such as, for example, overweight horses. In this case, the biscuit may still be fed free choice to the horse, as will be discussed in further detail below. Furthermore, the relatively low sugar fibrous material may be used in any of the above described embodiments, as desired.

Figure 5:
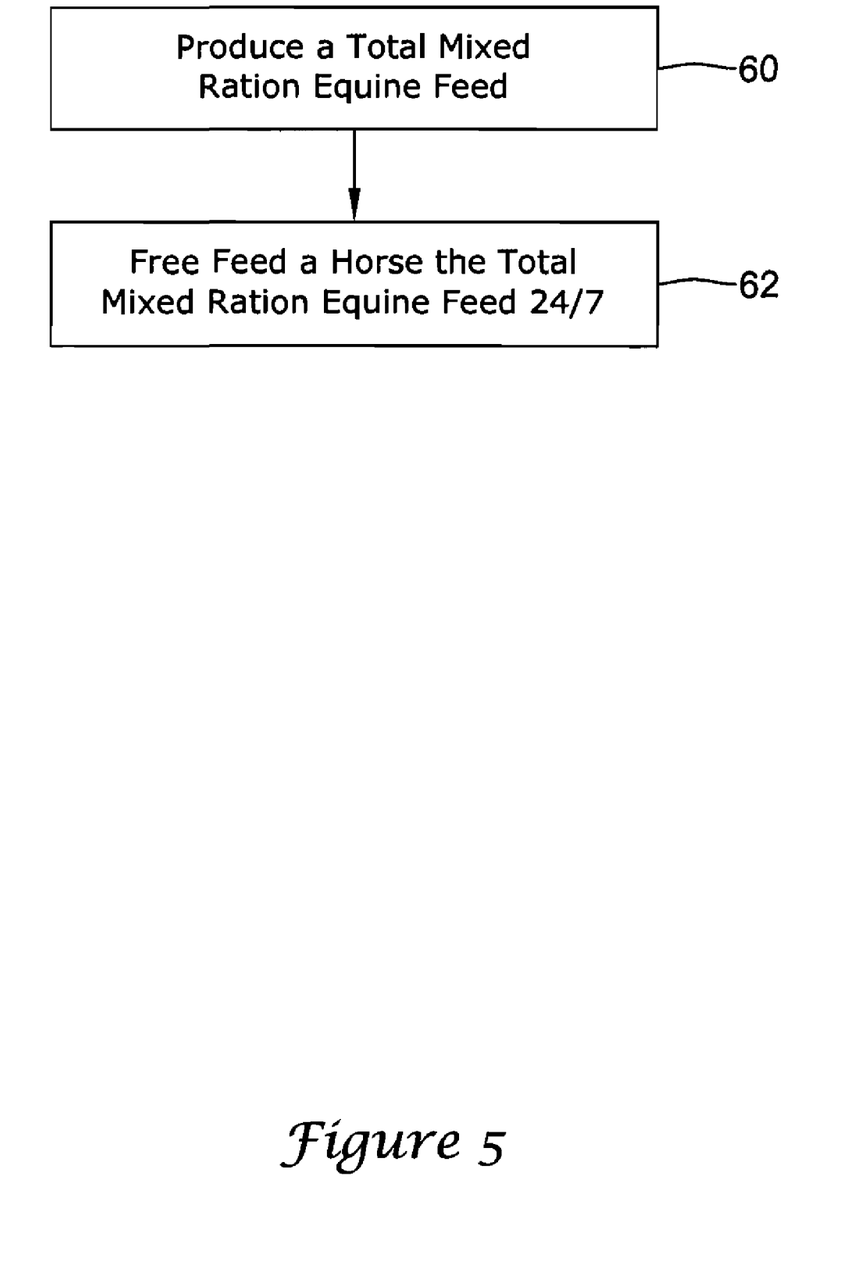
FIG. 5 is a flow diagram of an illustrative method of feeding the illustrative biscuit to horses.

FIG. 5 is an illustrative method of feeding the illustrative TMR biscuit to horses. In block 60, a TMR biscuit can be produced similar to that discussed previously. Then, in block 62, the TMR biscuit can be fed free choice to horses 24 hours a day, 7 days a week (24/7). Other types of supplemental horse feed are typically fed to the horses for a short period of time, such as, for example, 30 minutes to one hour, a couple times a day.

In some cases, the free choice feeding of a total mixed ration to a horse may be beneficial to the health of the horse. In some cases, it may help to simulate the natural grazing activities of the horse. Additionally, the free choice feeding method may help the digestive system to work better, because it is not sitting empty or lacking access to all the nutrients that it is in need of for long periods of time.

In the illustrative embodiment, the forage based biscuit may include nutritional supplements, such as vitamins, minerals and other feed elements, to compensate for the deficiencies of the forage. However, the present embodiment may limit the amount of grain in the feed to achieve a relatively low non-structural carbohydrate (NSC) value.

The present invention may have many advantages over other types of feed. One advantage may be that the biscuit, being a TMR, may be the only feed that is needed for the horse (with the addition of salt and water). The horse owner may not have to buy multiple feeds for the horse. Additionally, this may help to reduce feeding errors by the horse owner or other caretakers as well. Another advantage may be that the biscuit may be consistent and balanced so that every mouthful consumed is the same for the horse.

In some cases, one advantage of having the TMR may be that when traveling to events, the horse may be able to maintain the same diet. The inconsistent quality and accessibility of forages may no longer be an issue. Another advantage may be that the TMR may have specific diets available to help maintain the health for many types, sizes, ages, and/or activities of horses.

Another advantage may be that, when the formula is specifically designed for the horse, there may be a decrease in the amount of manure and waste of the horse. In some cases, the illustrative TMR biscuit being fed free choice to a horse may improve the health of the horse. For example, it may decrease health problems or issues such as, for example, gastric ulcers, colic, laminitis, it may improve the immune system and the appearance of the horse, and may help the efficient digestion of feed nutrients.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A method of manufacturing total mixed ration equine biscuits, the method comprising:

(a) mixing and suspending fibrous material, wherein mixing and suspending fibrous material includes:
  providing a fibrous material;
  placing the fibrous material into a vertical blender, wherein placing the fibrous material into the vertical blender includes mixing the fibrous material and cutting the fibrous material and defines a mixed and cut fibrous material,
  mixing one or more nutritional supplements with the mixed and cut fibrous material in the vertical blender, and
  suspending the mixture of the one or more nutritional supplements and the mixed and cut fibrous material within the vertical blender to form a suspended feed;

(b) transferring and metering the suspended feed, wherein transferring and metering the suspended feed includes:
  transferring the suspended feed on a conveyer to a metering box to form metered feed; and (c) densifying the metered feed, wherein densifying the metered feed includes:
  transferring the metered feed to a second mixer,
  mixing the metered feed with the second mixer,
  pressure impregnating at least some of the one or more nutritional supplements into at least some of the fibers of the fibrous material to formed a pressure impregnated metered feed, and
  extruding the pressure impregnated metered feed to form a plurality of total mixed ration biscuits that each have a relatively consistent nutritional balance.

2. The method of claim 1 wherein the nutritional supplements are impregnated into the fibers of the fibrous material by pressing.

3. The method of claim 2 wherein the pressing is performed with a cube.

4. The method of claim 2 wherein the pressing forms a biscuit or a cube.

5. The method of claim 2 wherein the pressing includes crushing at least some of the fibers.

6. The method of claim 5 wherein at least some of the crushed fibers have a length of 1.5 inches or smaller.

7. The method of claim 5 wherein at least some of the crushed fibers have a length that is greater than 1 inch.

8. The method of claim 1 wherein the fibrous material includes alfalfa.

9. The method of claim 1 wherein the fibrous material includes a grass.

10. The method of claim 1 further comprising processing the fibrous material to have a sugar content of less than 9 percent by weight.

11. The method of claim 10 wherein processing the fibrous material includes partially removing water soluble sugar from the fibrous material with water.

* * * * *

UNITED STATES PATENT AND TRADEMARK OFFICE
CERTIFICATE OF CORRECTION

| | | |
|---|---|---|
| PATENT NO. | : 8,273,400 B2 | Page 1 of 1 |
| APPLICATION NO. | : 11/757876 | |
| DATED | : September 25, 2012 | |
| INVENTOR(S) | : Harlan R. Anderson | |

It is certified that error appears in the above-identified patent and that said Letters Patent is hereby corrected as shown below:

Col. 10, Line 34, Claim 3
delete "cube", and insert therefor --cuber--.

Signed and Sealed this
Fourth Day of December, 2012

David J. Kappos
*Director of the United States Patent and Trademark Office*